UNITED STATES PATENT OFFICE.

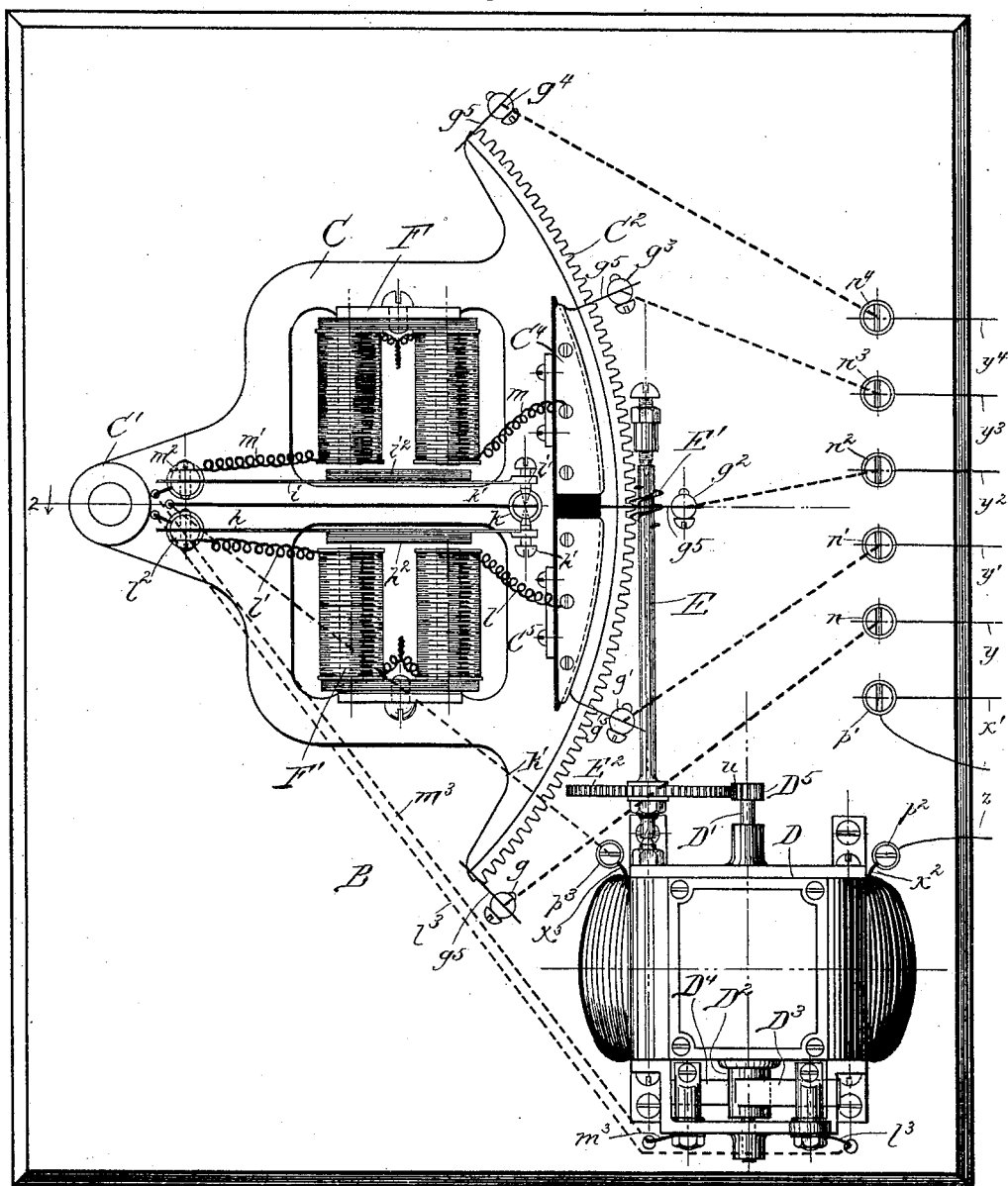

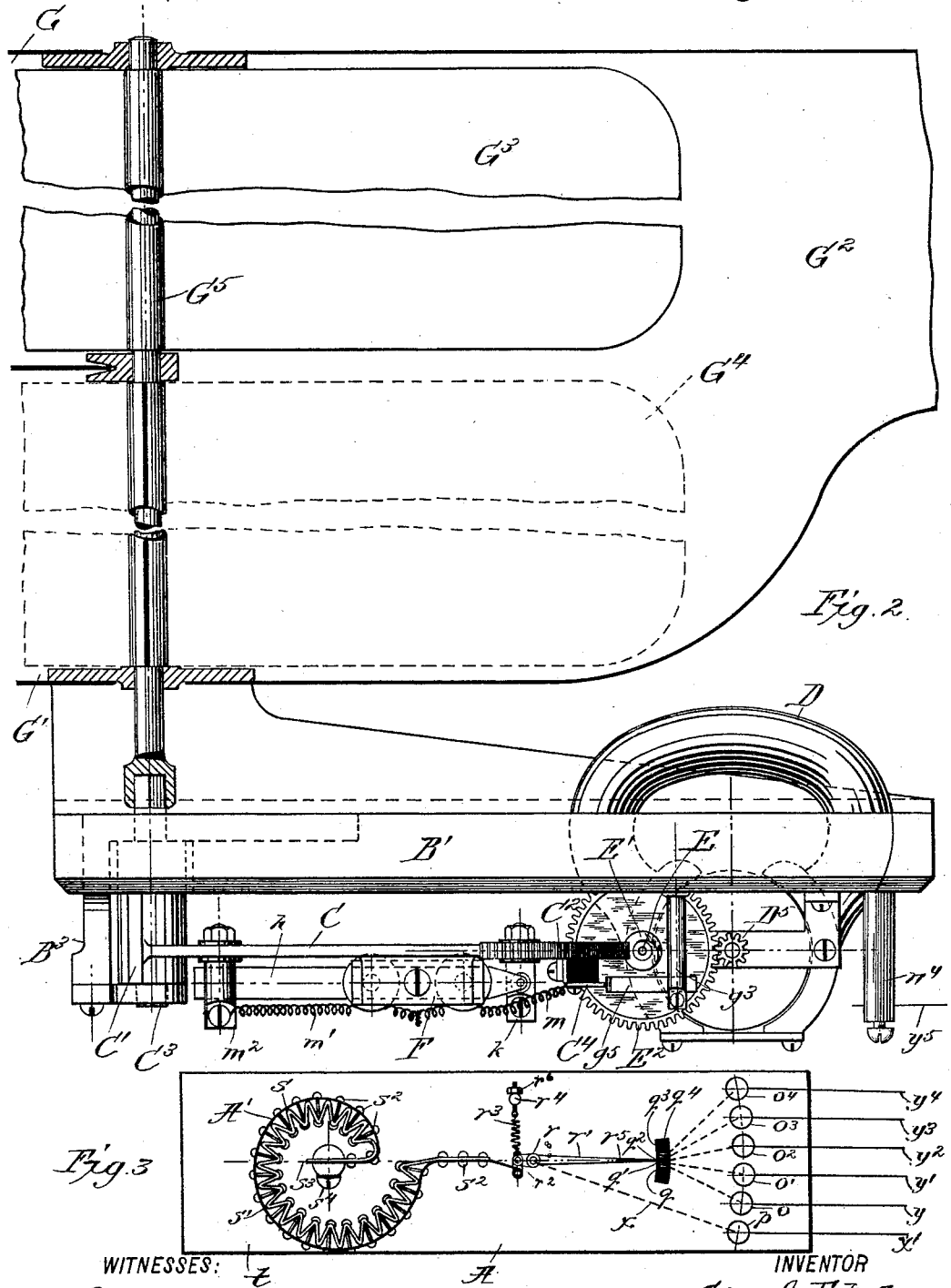

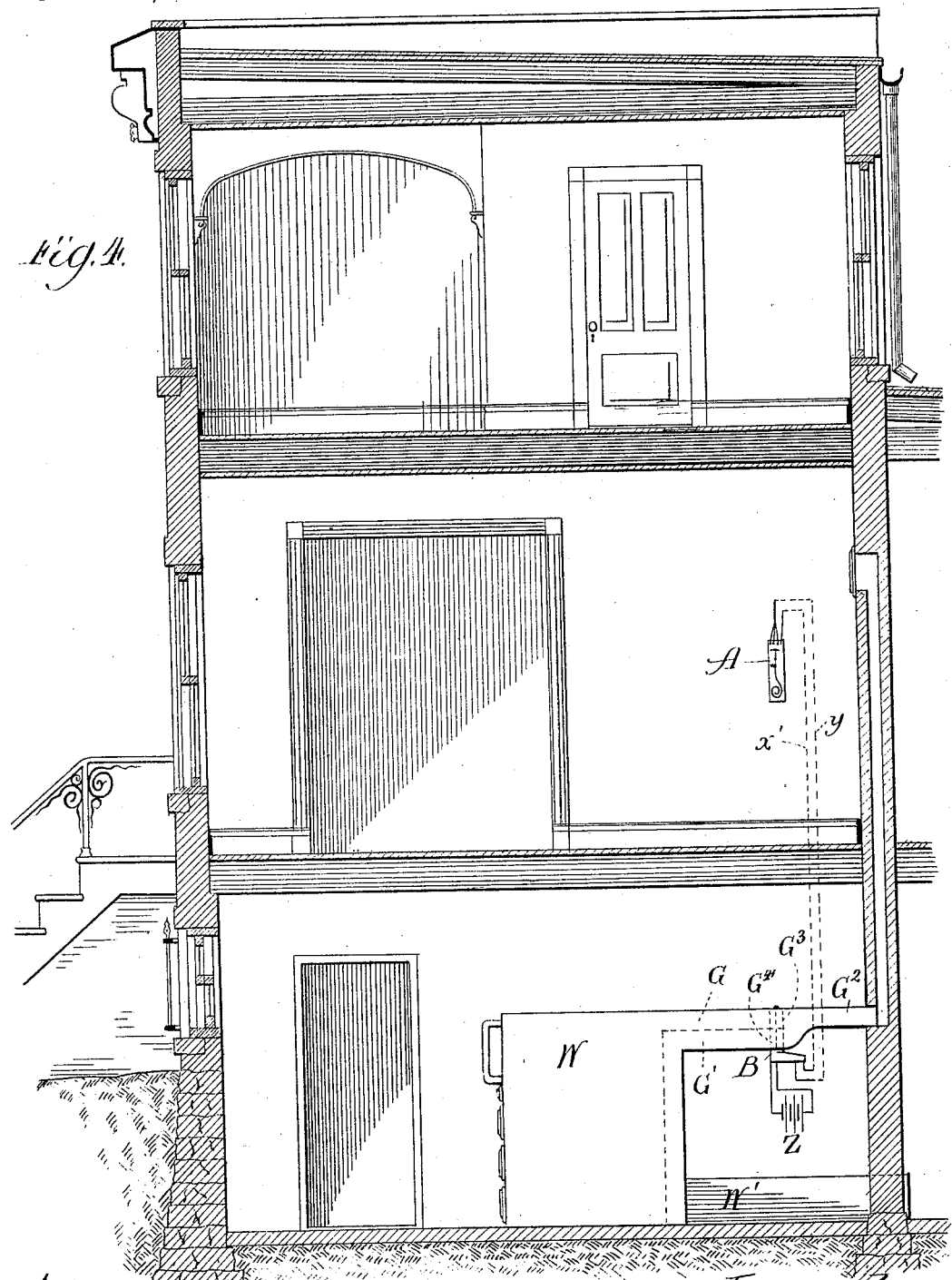

SVEN A. EKEHORN, OF MILWAUKEE, WISCONSIN.

ELECTRIC TEMPERATURE-CONTROLLING DEVICE.

SPECIFICATION forming part of Letters Patent No. 543,929, dated August 6, 1895.

Application filed May 1, 1894. Serial No. 509,683. (No model.)

*To all whom it may concern:*

Be it known that I, SVEN A. EKEHORN, a citizen of the United States, residing at Milwaukee, in the county of Milwaukee and State of Wisconsin, have invented a new and useful Improvement in Electric Temperature-Controlling Devices, of which the following is a specification.

My invention relates to improvements in electric temperature-controlling devices for buildings or other inclosures, and of the class in which a thermostat in the chamber wherein the temperature is to be regulated controls the circuit containing an electric motor to regulate a valve or damper mechanism, which governs the supply of the heating medium to the chamber, the automatic working of the thermostat serving to actuate the motor to open and close the valve or damper and thus maintain the air in the chamber at the desired temperature.

My object is to provide a device of the class defined, of an improved construction for use, more especially, though I do not intend this in any sense as a limitation, in connection with a certain hot-air heating system in which the air-supply pipe leading to the chamber communicates with both a hot-air and a cool-air supply, the motor operating to turn valves or dampers between the air-pipe and both the said supplies simultaneously, whereby the air flowing through the pipe to the chamber may be properly tempered without varying its volume.

In the drawings, Figure 1 is a bottom plan view of my improved electric valve or damper turning mechanism; Fig. 2, a view partly in elevation and partly in section on line 2 of Fig. 1, showing the mechanism connected to a damper-stem; Fig. 3, a thermostat of the construction I prefer to employ; and Fig. 4, a broken section of a building provided with my improvements, the latter being shown partly in elevation and partly by diagram.

A represents a thermostatic device upon a support or board $t$, which sustains the parts and permits them to be fastened in any desired position upon the wall of the chamber in which the heat is to be regulated. The thermostatic bar A' is of helical shape, as shown, consisting preferably of a convoluted strip $s$ of zinc and a strip $s'$ of steel, the two strips being fastened together by rivets $s^2$ of iron. At its end $s^3$ the bar A' is fastened by means of a screw-clamp $s^4$ to the board $t$ in a manner to leave it free to vibrate under expansion and contraction toward its opposite end.

Pivotally mounted upon a pin or binding-post $r$ is a needle $r'$, pivotally connected at its short arm $r^2$ to the free end of the thermostatic bar, and extending from the short arm $r^2$ of the needle is a spring $r^3$, fastened at its opposite end to a pin $r^4$ on the board $t$. The long arm $r^5$ of the needle wipes across five thermostat-contacts $q$, $q'$, $q^2$, $q^3$, and $q^4$, respectively, and all insulated from each other. At normal temperature—say 70° Fahrenheit—the thermostatic bar and needle are in the position shown in the drawings, wherein the long arm $r^5$ of the needle engages the contact $q^2$. The contact $q^2$ is therefore the normal-temperature contacts, the contacts $q'$ $q$ being low-temperature contacts and the contacts $q^3$ $q^4$ high-temperature contacts. Rise of the temperature in the chamber will cause the thermostat A' to vibrate in the direction of swinging the needle $r'$ against the resistance of the spring $r^3$ to the contact $q^3$, and still further rise of temperature will cause the needle to be swung to the contact $q^4$. When the temperature falls below 70° the thermostat moves with the spring $r^3$ and swings the needle to the contact $q'$, or if the fall of temperature exceeds a certain number of degrees the needle will be swung to the contact $q$. On the board $t$ is a binding-post $p$, connected by a wire, as indicated at $x$, with the needle-pivot $r$. Also upon the board $t$ are five binding-posts $o$ $o'$ $o^2$ $o^3$ $o^4$, connected, respectively, as indicated, with the respective contacts $q$, $q'$, $q^2$, $q^3$, and $q^4$.

B is a damper-turning mechanism mounted upon a base B'. On the base B' is a binding-post or terminal $p'$, connected by means of a wire $x'$ with the binding-post $p$ of the thermostat. Also upon the base B' are five binding-posts $n$, $n'$, $n^2$, $n^3$, and $n^4$, connected, respectively, and by separate wires $y$ $y'$ $y^2$ $y^3$ $y^4$ with the respective binding-posts $o$ $o'$ $o^2$ $o^3$ $o^4$ of the thermostat. In practice the wires $y$, $y'$, $y^2$, $y^3$, and $y^4$ may be bunched together and insulated from each other in a cable Y, as indicated in Fig. 4.

C is a frame or lever provided at one end with a hub C' and presenting a segmental rack $C^2$, describing an arc of a circle, of which the hub C' is the center. The hub C' is fixed upon a shaft $C^3$, journaled in a bracket $B^3$ on the under side of the base B'.

D is an electric motor secured upon the base. D' is the shaft of the motor carrying a commutator $D^2$, and $D^3$ $D^4$ are the brushes. One field-magnet of the motor is connected by a wire $x^2$ to a binding-post or terminal $p^2$, and the other field-magnet is connected by a wire $x^3$ with a binding-post $p^3$.

Journaled upon the base is a shaft E, provided with a worm E', engaging the teeth of the rack $C^2$ and carrying a gear-wheel $E^2$, which engages a pinion $D^5$ on the motor-shaft D'. On the frame C are two contact-plates $C^4$ and $C^5$, insulated from the frame C and from each other. The contact-plates extend to equal distances on opposite sides of the central point of the rack and their outer edges describe arcs parallel with the arc of the rack.

On the frame C at opposite sides of its center are electromagnets F and F'. The magnet F is connected at one of its poles by means of a wire $m$ with the contact-plate $C^4$, and the other pole of the magnet F is connected by means of a wire $m'$ with a binding-post $m^2$ near the hub C'. One pole of the magnet F' is connected by means of a wire $l$ with the contact-plate $C^5$, and the other pole of the magnet F' is connected by means of a wire $l'$ with a binding-post $l^2$ near the hub C'. The binding-post $m^2$ is connected by means of a wire $m^3$ with the brush $D^4$ of the motor, and the binding-post $l^2$ is connected by means of a wire $l^3$ with the brush $D^3$ of the motor.

On the frame C, near its free side and midway between the ends of the rack, and therefore midway between the magnets F F', is a contact-projection $k$, from which an insulated wire $k'$ extends across the surface of the frame to a point near the hub, thence through the frame and to the binding-post $p^3$. Fastened at one end to the binding-post $m^2$ is a spring-arm $i$, which extends past the poles of the magnet F, and at its free end carries a set-screw, affording a contact-point $i'$. Between its ends the spring $i$ carries the armature $i^2$ of the electromagnet F, and the tendency of the spring is to press the contact-point $i'$ against the contact-projection $k$. Fastened at one end to the binding-post $l^2$ is a spring $h$, extending across the poles of the magnet F', and provided at its free end with a set-screw, affording a contact-point $h'$. Between its ends the spring $h$ carries the armature $h^2$ of the electromagnet F', and the tendency of the spring $h$ is to press the contact-point $h'$ against the contact-projection $k$. Normally the armatures $i^2$ $h^2$ are close to but out of contact with the electromagnets F F', as shown, owing to the normally de-energized condition of the latter.

Adjacent to the path of the rack $C^2$ are binding-posts or terminals $g$, $g'$, $g^2$, $g^3$, and $g^4$, connected, respectively, by wires with the binding-posts $n$, $n'$, $n^2$, $n^3$, and $n^4$. The binding-posts $g$, $g'$, $g^2$, $g^3$, and $g^4$ are located a distance apart slightly exceeding the length of the contact-plates $C^4$ $C^5$, and are each provided with a flexible brush $g^5$, which, in the movement of the frame C, as hereinafter described, are engaged by the contact-plates $C^4$ $C^5$, the said brushes being at all times out of the path of the rack $C^2$.

The frame C and parts carried thereby form an electromagnetic-contact device.

It is to be understood, of course, that all the various binding-posts, wires, and contact-surfaces are insulated from each other. The device is suitably connected at the binding-posts or terminals $p'$ $p^2$ into circuit by means of wires $z$ with an electric generator Z. The frame or lever C and parts carried thereby form an electromagnet contact device in a normally-open generator-circuit.

The operation is as follows: In the position illustrated in the drawings, the thermostatic needle, under the influence of normal temperature, is at the contact $q^2$, whereby through the binding-post $o^2$, wire connection $y^2$ with the binding-post $n^2$, and disengagement of the brush $g^5$ from either contact-plate $C^4$ $C^5$, the circuit is broken and the parts are at rest. Under a rise of temperature in the room where the thermostat is located the needle $r'$ will be moved to the contact $q^3$. The current from the generator through the terminals $p'$ and wire $x'$ to the binding-post $p$, thence through the needle $r'$, contact $q^3$, binding-post $o^3$, and binding-posts $n^3$ $g^3$, through the brush $g^5$ on the latter to the contact-plate $C^4$. It excites the magnet F, causing it to attract the armature $i^2$ and release the point $i'$ from the contact-projection $k$. From the magnet F the current passes from the binding-post $m^2$ through the wire $m^3$ to the brush $D^4$ to the commutator $D^2$, excites the armature and goes thence through the brush $D^3$, wire $l^3$, binding-post $l^2$, spring $h$, contact $k$, and wire $k'$ to the binding-post $p^3$, and thence through the field of the motor to binding-post $p^2$ and the generator. The armature of the motor is thus caused to be revolved in one certain direction with the shaft D', and through the latter revolve the shaft E and its worm to swing the frame C in the direction away from the binding-post $g$, whereby the contact-plate $C^4$ wipes across the brush $g^5$ on the binding-post $g^3$ until the plate $C^4$ is passed and the brush extends between the plates $C^4$ $C^5$, whereby the circuit is again broken, the motor caused to stop, and the spring-arm $i'$ permitted to spring to its normal position.

G is a flue leading from a hot-air furnace W. G' is a flue leading from a cool-air supply W" and $G^2$ is an air-pipe extending to the chamber in which the thermostat A is located. Where the flues G G' join the air-pipe $G^2$ are dampers $G^3$ $G^4$ upon a common stem $G^5$, connected to the shaft $C^3$. The damper $G^3$ controls the flow of hot air from the flue G to the pipe $G^2$, and the damper $G^4$ controls the flow of cold air from the flue $G'$ to the pipe $G^2$, the dampers being at right angles to each other upon the stem $G^5$, whereby when one is opened to its fullest extent the other is closed. When the heat-regulating mechanism is caused to operate, as described, under the rise of heat in the chamber, the frame C and damper-stem $G^5$ are turned, as described, which is in the direction of partly opening the cold-air damper and of partly closing the hot-air damper.

If the temperature in the chamber continues to rise, the needle is turned to the contact $q^4$ and makes circuit through the brush $g^5$ on the binding-post $g^4$, which then contacts with the end of the contact-plate $C^4$. The current passes through and actuates the motor, as before described, until the frame C is turned, and the brush $g^5$ on the binding-post $g^4$ extends between the contact-plates $C^4 C^5$. This further turning of the frame C and damper-stem produces entire closure of the hot-air damper, and the opening of the cold-air damper to its fullest extent.

As temperature falls in the chamber when the needle is at the contact $q^4$ and the parts are in the position last described, the needle turns to the contact $q^3$, whereby the current passes through $o^3$ to $n^3$ and the binding-post $g^3$, the brush $g^5$ of which is then at the contact-plate $C^5$, in the same position with relation to the plate $C^5$ as the brush of the binding-post $g'$. (Illustrated in the drawings.) The passage of the current from the binding-post $g^3$ is through the plate $C^5$, causing the magnet $F'$ to be energized, attract the armature $h^2$ and disconnect the contact $h'$ from the contact-projection $k$. The current thus passes to the binding-post $l^2$ and through the wire $l^3$ to the brush $D^3$, thence through the armature and brush $D^4$, through the wire $m^3$, binding-post $m^2$, spring $i$, contact $k$, and wire $k'$ to the motor-field, and thence to $p^2$ and generator. This passage of the current causes the motor-armature and its shaft $D'$ to be revolved in the direction contrary to that hitherto described, whereby the shaft E and worm $E'$ rotate to turn the frame C until the brush $g^5$ on the binding-post $g^3$ extends between the plates $C^4 C^5$, when the circuit will be broken and the motor stopped. Further reduction of the heat in the chamber will cause the thermostatic needle to swing to the contacts $q^2$ and $q'$, and if the temperature falls much below normal to the contact $q$. The successive movements of the needle will direct the current by successive stages through the brushes of the binding-post $g^2 g' g$ and produce in each stage opening movement of the hot-air damper and closing of the cold-air damper.

While I prefer to provide the thermostat with five contacts and the valve or damper-turning mechanism, as described, whereby the dampers may each be turned to the positions of being closed, half-opened, and fully opened, only three contacts at the thermostat, and valve-turning mechanism to correspond may be provided, if desired, to turn the dampers to the positions of being fully closed and fully opened without intermediate position; or, if desired, additional thermostatic contacts, with valve-turning mechanism having shorter contact-plates and additional binding-posts and brushes $g^5$, connected with the thermostat, may be provided to increase the number of positions to which the dampers may be turned.

In an air-heating system of the class mentioned separate damper-turning mechanism B will be provided at each damper and connected by wires $x'$ $y$ $y'$ $y^2$ $y^3$ $y^4$ with a thermostat A in the chamber to which the respective pipe $G^2$ leads.

The damper-turning mechanism may be housed in a dust-excluding case, and all the parts being of a construction to insure durability, the device will require no attention and will at all times be quick and positive in its action. A thermostat constructed as described is particularly sensitive and quick to operate under slight variation of temperature. The tension of the spring $r^3$ may be regulated by means of a thumb-screw $r^6$ to increase or diminish the strain on the thermostat, and it operates as a counterbalance or retracting-spring for the latter. While the spring insures smooth working of the thermostat, it tends to hold it and the needle more securely in adjusted position.

The relative expansion of zinc and steel being about three to one and the zinc strip $s$, due to the convolutions, being about three times as long as the steel strip $s'$, the expansion of the zinc strip is about nine to one with relation to the steel strip, giving a decided movement to the vibrating end of the arm under very slight temperature variations. Thus, with the differential movement between the short arm and long arm of the needle, the long arm may be caused to move from one contact to another under the variation of less than one degree of temperature, the contacts being large enough to present the desired extent of surface and far enough apart for proper insulation.

I prefer to construct my improvement in all its parts as shown and described. It may, however, be modified in the matter of details of construction without departing from the spirit of my invention, as defined by the claims.

What I claim as new, and desire to secure by Letters Patent, is—

1. In an electric temperature-controlling device, a thermostat, fastened at one end to vibrate at its opposite end, and formed of two parallel extending differentially expanding sections, fastened together, one section being convoluted, substantially as described.

2. In an electric temperature-controlling device, the combination, with the valve or damper-shaft of the heater to be controlled electric circuit and source of electric energy, of a thermostatic device having contacts, an electric motor, and an electro-magnet contact-device geared to the motor-shaft, and having reversing electric connections with the motor, all said parts being in normally open generator circuits, controlled by said magnet device, whereby movement of the thermostat from one of its contacts to another closes one of said normally open circuits, to actuate the motor to turn the valve or damper-shaft, substantially as described.

3. In an electric temperature-controlling device, the combination, with the valve or damper-shaft of the heater to be controlled, electric circuit and source of electric energy, of a thermostatic device having three or more thermostatic contacts, an electric-motor in circuit with the thermostat, and a movable electro-magnetic contact device connected with the valve or damper-shaft and geared to the motor-shaft, carrying two contact-plates each in a separate normally-open generator circuit with one pole of the motor, an electro-magnet between each contact-plate and the motor, the magnets separately controlling the circuits to shunt the current through either said contact-plates and the motor, and terminals in the path of the said contact-plates separately in circuit with the thermostatic contacts, substantially as and for the purpose set forth.

4. In an electric temperature controlling device, the combination, with the valve or damper-shaft of the heater to be controlled, of a thermostatic device having a thermostat in a normally open generator circuit, a contact in position to be engaged by the thermostat at a predetermined normal temperature, and high temperature and low temperature thermostatic contacts on opposite sides thereof, an electric motor, and a movable electro-magnetic contact-device, connected with the valve or damper-shaft and geared to the motor-shaft, provided with two contact-plates insulated from each other and two electro-magnets each of which, with one of the said contact-plates and one of the poles of the motor, is in a separate normally open circuit controlled by the respective electro-magnet, and brush-terminals connected respectively with the respective thermostatic contacts and extending in the path of said contact-plates, in position to be engaged, only one at a time, by said plates respectively, the parts being so arranged that movement of the thermostat from one to another of the thermostatic contacts, closes the normally open circuit through the contact with which it engages, the brush-terminal of said contact, one said contact-plate and one pole of the motor to energize the respective electro-magnet to shunt the generator current through the respective motor pole and thereby actuate the motor to turn the electro-magnetic contact-device and through the latter to turn the valve or damper, substantially as described.

5. In an electric temperature-controlling device, the combination, with a thermostatic device having three or more thermostatic contacts, of valve or damper-turning mechanism comprising a base, an electric motor on the base in circuit with the thermostat, a swinging damper-turning lever pivotally mounted on the base having a segmental rack geared to the motor and carrying contact-plates, insulated from each other and connected respectively in circuit with the opposite poles of the motor, electro-magnets between the contact-plates and motor having circuit making and breaking armatures, brushes on the base located at intervals in the path of said contact-plates a distance apart slightly exceeding the lengths of said plates and in circuit with the respective thermostatic contacts, substantially as and for the purpose set forth.

6. In an electric temperature-controlling device, the combination of a thermostatic device having thermostatic contacts $q$ $q'$ $q^2$ $q^3$ and $q^4$, and valve or damper-turning mechanism comprising a base, an electric motor on the base in circuit with the thermostat, an electro-magnet contact-device comprising a lever pivotally mounted on the base and connected with the valve or damper and having a segmental rack geared to the motor-shaft, binding-posts $m^2$ $l^2$ in circuit with opposite poles of the motor, a contact-plate $C^4$ in circuit through an electro-magnet F with the binding post $m^2$, a contact plate $C^5$ in circuit with the binding post $l^2$ through a magnet $F'$, a spring $i'$ normally engaging a contact-projection, $k$, and carrying the armature of the magnet F, a spring $h$ on the terminal $l^2$ also normally engaging the contact $k$ and provided between its ends with the armature of the magnet $F'$, the contact $k$ being in circuit with the motor field and terminals $g$ $g'$ $g^2$ $g^3$ $g^4$, each in circuit with one of the thermostatic-contacts and carrying a brush in the path of the contact-plates $C^4$ $C^5$, the whole being constructed and arranged to operate substantially as and for the purpose set forth.

SVEN A. EKEHORN.

In presence of—
M. J. FROST,
W. U. WILLIAMS.